(12) United States Patent
Derks et al.

(10) Patent No.: US 9,102,131 B2
(45) Date of Patent: *Aug. 11, 2015

(54) TEXTURED FILM AND PROCESS FOR MANUFACTURE THEREOF

(75) Inventors: Kristopher J. Derks, Woodbury, MN (US); Jeffrey W. Hagen, Woodbury, MN (US); James E. Lockridge, Saint Paul, MN (US); Michael J. Schiesl, Hutchinson, MN (US); Adam D. Haag, Woodbury, MN (US); Jeffrey A. Peterson, Lake Elmo, MN (US); Stephen A. Johnson, Woodbury, MN (US); Mark J. Pellerite, Woodbury, MN (US); Michael L. Steiner, New Richmond, WI (US); Hang K. Loi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/635,942

(22) PCT Filed: Mar. 16, 2011

(86) PCT No.: PCT/US2011/028605
§ 371 (c)(1),
(2), (4) Date: Sep. 19, 2012

(87) PCT Pub. No.: WO2011/119687
PCT Pub. Date: Sep. 29, 2011

(65) Prior Publication Data
US 2013/0022788 A1    Jan. 24, 2013

Related U.S. Application Data

(60) Provisional application No. 61/317,945, filed on Mar. 26, 2010.

(51) Int. Cl.
*B32B 1/00* (2006.01)
*B32B 37/14* (2006.01)
(Continued)

(52) U.S. Cl.
CPC ............... *B32B 37/144* (2013.01); *B32B 3/085* (2013.01); *B32B 27/08* (2013.01); *B32B 27/36* (2013.01);
(Continued)

(58) Field of Classification Search
CPC combination set(s) only.
See application file for complete search history.

(56) References Cited

U.S. PATENT DOCUMENTS 3,051,452 A    8/1962 Nobel
3,182,965 A    5/1965 Sluijters
(Continued)

FOREIGN PATENT DOCUMENTS

WO    2008/133875    11/2008
WO    WO 2009/014897    1/2009

OTHER PUBLICATIONS

MiSUMi Technical Tutorial: http://www.misumi-techcentral.com/tt/en/mold/2011/12/106-glass-transition-temperature-tg-of-plastics.html. Dec. 16, 2011.*

(Continued)

*Primary Examiner* — David Sample
*Assistant Examiner* — Nicole T Gugliotta
(74) *Attorney, Agent, or Firm* — Gregg H. Rosenblatt (57) ABSTRACT

A textured film, a process for manufacture of the textured film, and a light management stack, a backlight, and a display using the textured film are described. Generally, the surface texture of a polymeric film, such as a polymeric optical film, is controlled by incorporation of a fracturable coating that fractures upon stretching the film.

12 Claims, 5 Drawing Sheets (51) Int. Cl.
*B32B 3/08* (2006.01)
*B32B 27/08* (2006.01)
*B32B 27/36* (2006.01)
*B32B 37/15* (2006.01)
*B32B 37/24* (2006.01)
*B32B 38/00* (2006.01)

(52) U.S. Cl.
CPC ......... *B32B 37/153* (2013.01); *B32B 2037/243* (2013.01); *B32B 2038/0028* (2013.01); *B32B 2255/10* (2013.01); *B32B 2255/26* (2013.01); *B32B 2307/40* (2013.01); *B32B 2307/514* (2013.01); *B32B 2551/00* (2013.01); *Y10T 428/24355* (2015.01); *Y10T 428/24372* (2015.01)

(56) References Cited

U.S. PATENT DOCUMENTS

| | | | |
|---|---|---|---|
| 3,195,865 A | | 7/1965 | Harder |
| 3,687,589 A | | 8/1972 | Schrenk |
| 3,737,882 A | | 6/1973 | Furuoya |
| 3,773,882 A | | 11/1973 | Schrenk |
| 3,884,606 A | | 5/1975 | Schrenk |
| 4,087,485 A | * | 5/1978 | Huff .............................. 525/193 |
| 4,764,425 A | * | 8/1988 | Balloni et al. ................ 428/331 |
| 5,094,788 A | | 3/1992 | Schrenk |
| 5,389,324 A | | 2/1995 | Lewis |
| 5,968,666 A | * | 10/1999 | Carter et al. .................. 428/480 |
| 6,179,948 B1 | | 1/2001 | Merrill |
| 6,783,349 B2 | | 8/2004 | Neavin |
| 6,827,886 B2 | | 12/2004 | Neavin |
| 6,872,458 B1 | | 3/2005 | Rudd |
| 6,916,440 B2 | | 7/2005 | Jackson |
| 6,936,209 B2 | | 8/2005 | Jackson |
| 6,939,499 B2 | | 9/2005 | Merrill |
| 6,949,212 B2 | | 9/2005 | Merrill |
| 2003/0214720 A1 | * | 11/2003 | Bourdelais et al. ............ 359/599 |
| 2004/0081799 A1 | * | 4/2004 | Kaminsky et al. ............ 428/141 |
| 2004/0176513 A1 | * | 9/2004 | Cakmak et al. ................ 524/420 |
| 2004/0228141 A1 | | 11/2004 | Hay |
| 2006/0068176 A1 | | 3/2006 | Zafiroglu |
| 2006/0084780 A1 | | 4/2006 | Hebrink |
| 2006/0226561 A1 | | 10/2006 | Merrill |
| 2007/0047080 A1 | | 3/2007 | Stover |
| 2008/0192352 A1 | | 8/2008 | Laney |
| 2008/0252980 A1 | | 10/2008 | Hebrink |
| 2008/0285304 A1 | | 11/2008 | Rankin |
| 2014/0308477 A1 | * | 10/2014 | Derks et al. .................. 428/141 |

OTHER PUBLICATIONS

Japanese Office Action in JP Patent Application No. 2013-501311, dated Feb. 13, 2015, 3pgs.

\* cited by examiner

TEXTURED FILM AND PROCESS FOR MANUFACTURE THEREOF

CROSS REFERENCE TO RELATED APPLICATIONS

This application is a national stage filing under 35 U.S.C. 371 of PCT/US2011/028605, filed Mar. 16, 2011, which claims priority to U.S. Application No. 61/317,945, filed Mar. 26, 2010, the disclosure of which is incorporated by reference is its entirety herein.

FIELD OF THE INVENTION

The present disclosure relates generally to a textured film and a process for manufacture thereof, and more particularly to processes in which the surface texture of a polymeric film is controlled by incorporation of a fractured coating.

BACKGROUND

Over the past several years the use of polymeric films to produce high-quality optical films has been explored. The investigated polymeric optical films typically exploit differing indices of refraction between layers of a multilayer film. For example, a multilayer optical film (MOF) may be constructed by alternating polymer layers having high indices of refraction with polymer layers having low indices of refraction. Where two adjacent layers are formed with a relatively large mismatch between the respective indices of refraction, light of a particular wavelength is reflected at the interface of the two layers. The wavelength of light reflected at the interface is dependent on the optical thickness of the adjacent layers. Optical films may also be made of polymeric blends exploiting relative refractive indices relationships of different phases of the blend.

One type of multilayer optical film uses birefringent polymers to produce the mismatch between adjacent indices of refraction. In such films, the multilayer film is drawn either uniaxially in a direction along only one in-plane axis of the film or biaxially in a direction along two in-plane orthogonal axes of the film. As a result of drawing, molecules within one of the two adjacent layers become oriented in the direction of the draw. The molecular orientation alters the index of refraction of the affected layer in the draw direction.

Drawing a multilayer film, where one of the layers of the film is birefringent, can be used to obtain a mismatch of refractive indices of two adjacent layers in the draw direction. If the refractive indices of the two layers in the non-drawn in-plane direction match, the multilayer film may be used to reflect light of one polarization and transmit light of another. Such a film may be employed, for example, as a reflective polarizer. If a multilayer film is drawn such that the affected layer is oriented in the direction of two orthogonal in-plane axes, a mismatch in both directions may be obtained. Such a film may be used to reflect light of both polarizations (e.g., a mirror for the respective wavelength of light).

Multilayer films are typically used in conjunction with additional optical films to effect desired management of light within, for example, a display. The multilayer films can be coated with additional layers after processing, or laminated to other films, such as, for example, diffusers, to accomplish a desired control of light passing through or incident on the multilayer film.

SUMMARY

The present disclosure relates generally to a textured film and a process for manufacture thereof, and more particularly to processes in which the surface texture of the optical film is controlled by incorporation of a fractured coating. In one aspect, the present disclosure provides a textured film that includes a strain-hardened polymeric film having a first major surface; a first polymer layer disposed on the first major surface; and a plurality of separated regions disposed on the first polymer layer. Further, each of the separated regions having a fractured layer adhered to the first polymer layer, wherein a portion of a first thickness of the first polymer layer adhered to each of the separated regions is greater than a second thickness of the first polymer layer between at least one adjacent separated region.

In another aspect, the present disclosure provides a method of texturing a film that includes providing a multilayer film comprising a polymer film and a polymer layer disposed on a first major surface of the polymer film, and disposing a fracturable layer on the polymer layer, opposite the polymer film. The method further includes stretching the multilayer film to fracture the fracturable layer into a plurality of separated regions, each of the separated regions adhered to the polymer layer, wherein a portion of a first thickness of the polymer layer adhered to each of the separated regions is greater than a second thickness of the polymer layer between at least one adjacent separated region.

In yet another aspect, the present disclosure provides a light management film stack that includes a strain-hardened polymeric film having a first major surface; a first polymer layer disposed on the first major surface; and a plurality of separated regions disposed on the first polymer layer. Further, each of the separated regions having a fractured layer adhered to the first polymer layer, wherein a portion of a first thickness of the first polymer layer adhered to each of the separated regions is greater than a second thickness of the first polymer layer between at least one adjacent separated region.

In yet another aspect, the present disclosure provides a backlight that includes a strain-hardened polymeric film having a first major surface; a first polymer layer disposed on the first major surface; and a plurality of separated regions disposed on the first polymer layer. Further, each of the separated regions having a fractured layer adhered to the first polymer layer, wherein a portion of a first thickness of the first polymer layer adhered to each of the separated regions is greater than a second thickness of the first polymer layer between at least one adjacent separated region.

In yet another aspect, the present disclosure provides a display that includes a strain-hardened polymeric film having a first major surface; a first polymer layer disposed on the first major surface; and a plurality of separated regions disposed on the first polymer layer. Further, each of the separated regions having a fractured layer adhered to the first polymer layer, wherein a portion of a first thickness of the first polymer layer adhered to each of the separated regions is greater than a second thickness of the first polymer layer between at least one adjacent separated region.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure describes some unique mechanisms to create amplified surface features in polymeric film surface layers, such as polymeric multilayer film surface layers including, for example, skin layers. It has been discovered that coatings that are applied before orientation (i.e., before stretching) of a polymeric film can subsequently fracture during stretching. Such fractured coatings can have an effect of locally "reinforcing" the skin of the multilayer film, amplifying the effect in surface roughness or texturing of the coating thickness in the finished film. The amplified surface roughness can be imposed without typically affecting the remainder of the multilayer film. This enables much greater surface relief and a light bending surface area, which can be important in optical films.

Various process considerations are important in making high quality polymeric films, polymeric multilayer films, polymeric multilayer optical films, and other optical devices in accordance with the present invention. Such films include, but are not limited to, optical films such as interference polarizers, mirrors, colored films, and combinations thereof. The films are optically effective over diverse portions of the ultraviolet, visible, and infrared spectra. Of particular interest are coextruded polymeric multilayer optical films having one or more layers that are birefringent in nature. The process conditions used to make each depends in part on (1) the particular resin system used and (2) the desired optical properties of the final film. In one particular embodiment, such polymeric multilayer optical films include, for example, Vikuiti™ Dual Brightness Enhancing Film (DBEF), Vikuiti™ Advanced Polarizing Film (APF), and Vikuiti™ Enhanced Specular Reflective (ESR) Film, all available from 3M Company.

Figure 1:
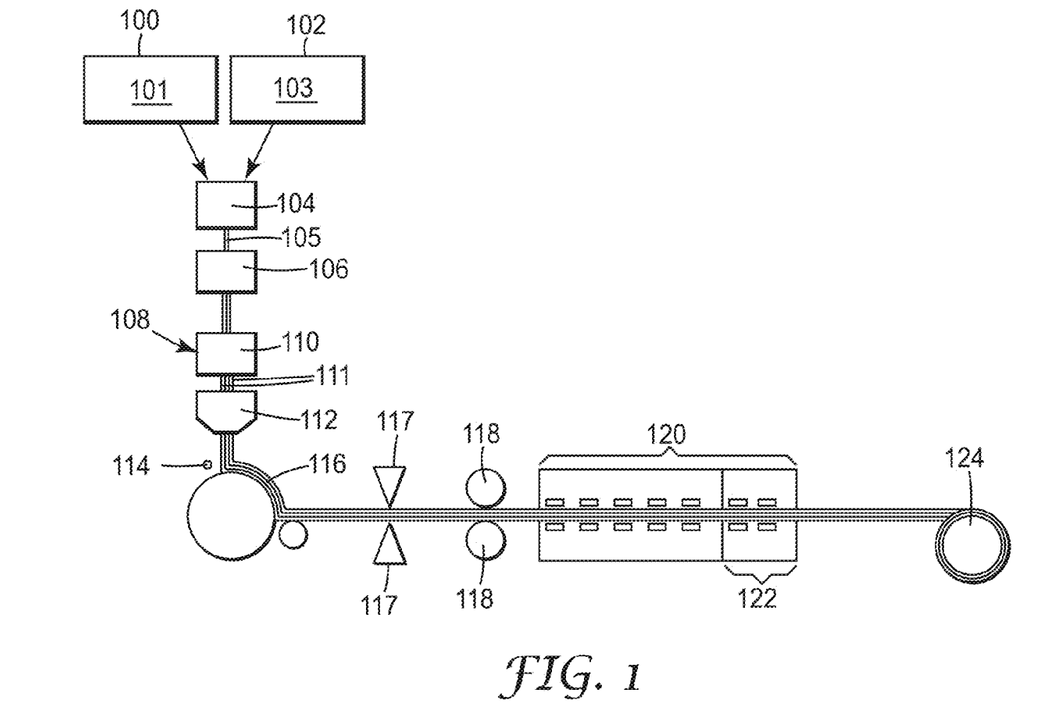
FIG. 1 is a schematic of a multilayer film process.

FIG. 1 shows a process of making a multilayer film such as a multilayer optical film described, for example, in U.S. Pat. No. 6,783,349 (Neavin et al.), which has been modified to make a textured film of the present disclosure, as described below. Materials 100 and 102, selected to have suitably different optical properties, are heated above their melting and/or glass transition temperatures and fed into a multilayer feedblock 104. Typically, melting and initial feeding is accomplished using an extruder for each material. For example, material 100 can be fed into an extruder 101 while material 102 can be fed into an extruder 103. Exiting from the feedblock 104 is a multilayer flow stream 105. A layer multiplier 106 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. If desired, skin layers 111 may be introduced into the multilayer optical film by feeding resin 108 (for skin layers) to a skin layer feedblock 110.

The multilayer feedblock feeds a film extrusion die 112. Examples of feedblocks are described in, for example, U.S. Pat. No. 3,773,882 (Schrenk) and U.S. Pat. No. 3,884,606 (Schrenk). As an example, the extrusion temperature may be approximately 295 degrees C. and the feed rate approximately 10-150 kg/hour for each material. It is desirable in most cases to have skin layers 111 flowing on the upper and lower surfaces of the film as it goes through the feedblock and die. These layers serve to dissipate the large stress gradient found near the wall, leading to smoother extrusion of the optical layers. Typical extrusion rates for each skin layer would be 2-50 kg/hr (1-40% of the total throughput). The skin material can be the same material as one of the optical layers or be a different material. An extrudate leaving the die is typically in a melt form.

The extrudate is cooled on a casting wheel 116, which rotates past pinning wire 114. The pinning wire pins the extrudate to the casting wheel. To achieve a clear film over a broad range of angles, one can make the film thicker by running the casting wheel at a slow speed, which moves the reflecting band towards longer wavelengths.

A fracturable coating can be applied using a coating station 117, to either one or both of the major surfaces of the multilayer film. The coating station 117 can include any known technique for coating a polymer web including, for example, knife coating, slot coating, slot fed knife coating, curtain coating, gravure coating, mayer rod coating, and the like. The fracturable coating can be applied in a solvent based coating, from a melted coating, or from a 100% solids coating, such as a radiation curable coating. The fracturable coating can then be dried, cooled, or cured to the major surface(s), by any known technique.

The multilayer film can then be oriented by stretching at ratios determined by the desired optical and mechanical properties. Longitudinal stretching can be done by pull rolls 118. Transverse stretching can be done in a tenter oven 120. If desired, the film can be bi-axially stretched simultaneously. Stretch ratios of approximately 3-4 to 1 are preferred, although ratios as small as 2 to 1 and as large as 9 to 1 may also be appropriate for a given film. In one particular embodiment, a higher draw ratio and the required higher draw temps for the strain hardening layer to orient appropriately without breaking might allow stretching such that a skin that would normally orient at a lower draw ratio may not orient at higher draw ratios. This may come at a cost to haze/clarity because the coating regions would be much more separated.

Stretch temperatures will depend on the type of birefringent polymer used, but 2 to 33 degrees C. (5 to 60 degrees F.) above its glass transition temperature would generally be an appropriate range. In some cases, particularly for olefins, the stretch temperature can range up to, but not exceeding, the melt temperature. The film can be heat set in the last two zones 122 of the tenter oven to impart the maximum crystallinity in the film and reduce its shrinkage. Employing a heat set temperature as high as possible without causing film breakage in the tenter can reduce the shrinkage during an optional heat conditioning step. A reduction in the width of the tenter rails by about 1-4% also serves to reduce film shrinkage. If the film is not heat set, heat shrink properties are maximized, which may be desirable in some security packaging applications. The film can be collected on windup roll 124.

In some applications, it may be desirable to use more than two different polymers in the optical layers of the multilayer film. In such a case, additional resin streams can be fed using similar means to resin streams 100 and 102. A feedblock appropriate for distributing more than two layer types analogous to the feedblock 104 could be used.

The process used for making coextruded polymeric multilayer films, such as polymeric multilayer optical films of the present invention, will vary depending on the resin materials selected and the optical properties desired in the finished film product.

Moisture sensitive resins should be dried before or during extrusion to prevent degradation. The drying can be done by any means known in the art. One well-known means employs ovens or more sophisticated heated vacuum and/or desiccant hopper-dryers to dry resin prior to its being fed to an extruder. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins should be dried to prevent damage to the moisture sensitive coextruded resin from moisture carried by the other resin.

Extrusion conditions are chosen to adequately feed, melt, mix and pump the polymer resin feed streams in a continuous and stable manner. Final melt stream temperatures are chosen within a range which avoids freezing, crystallization or unduly high pressure drops at the low end of the temperature range and which avoids degradation at the high end of the temperature range.

It is often preferable for all polymers entering the multilayer feedblock to be at the same or very similar melt temperatures. This may require process compromise if two polymers, whose ideal melt processing temperatures do not match, are to be coextruded.

Following extrusion, the melt streams are then filtered to remove undesirable particles and gels. Primary and secondary filters known in the art of polyester film manufacture may be used, with mesh sizes in the 1-30 micrometer range. While the prior art indicates the importance of such filtration to film cleanliness and surface properties, its significance in the present invention extends to layer uniformity as well. Each melt stream is then conveyed through a neck tube into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during processing.

Multilayer feedblocks are designed to divide two or more polymer melt streams into many layers each, interleave these layers, and merge the many layers of two or more polymers into a single multilayer stream. The layers from any given melt stream are created by sequentially bleeding off part of the stream from a flow channel into side channel tubes that feed layer slots for the individual layers in the feedblock. Many designs are possible, including those disclosed in U.S. Pat. Nos. 3,737,882; 3,884,606; and 3,687,589 to Schrenk et al. Methods have also been described to introduce a layer thickness gradient by controlling layer flow as described in U.S. Pat. Nos. 3,195,865; 3,182,965; 3,051,452; 3,687,589 and 5,094,788 to Schrenk et al, and in U.S. Pat. No. 5,389,324 to Lewis et al. In typical industrial processes, layer flow is generally controlled by choices made in machining the shape and physical dimensions of the individual side channel tubes and layer slots.

Biaxial orientation or crossed uniaxial orientation of at least some of the materials can also enhance dimensional stability, including thermal and hygroscopic expansion as well as shrinkage. Dimensional stability is often important in end use applications, e.g. in liquid crystal displays. Constraints on in-plane expansion, for example, can lead to out-of-plane warping or buckling that leads to diminished or lost utility of the display. A biaxially oriented film in accordance with one embodiment of the present invention greatly reduces or eliminates this problem. It should also be noted that the directional characteristics of the various mechanical properties can be varied. For example, the direction of maximum tear resistance or maximum thermal expansion may be coincident or perpendicular to the final draw direction. In some cases, material selection and processing may be chosen to tailor these directions and magnitudes, for example by control of the composition and relative thicknesses of skin layers (and internal protective boundary layers of multilayer films) as well as by control of the orientation of the optical materials.

Improved mechanical properties may be imparted to an optical film by imparting biaxial characteristics to non-optical materials in the film (e.g., protective boundary layers, skin layers, facilitating layers, and the like). For example, a multilayer construction may be fabricated in which the alternating layers include a first birefringent material and a second non-birefringent isotropic material. The film may also include one or more orient-able protective boundary or skin layers. Such a film may be processed with respect to a first direction under conditions which do not induce optical orientation in the first material of the optical layers but do orient the non-optical material in the direction of the first draw. The film may then be processed with respect to a second direction under conditions which orient the birefringent material of the optical layers and the non-optical material. The resulting film has adjacent layers of a uniaxial optically oriented birefringent material and an isotropic material forming the optical portion of the film and at least one biaxially oriented non-optical layer (e.g., protective boundary layers or skin layers).

A common challenge with multilayer films is the need for a surface which has a coefficient of friction (COF) and surface morphology conducive to winding rolls of the material. In some cases, a pre-mask can be applied to the film after stretching and before winding. In some cases, outer skin materials containing particles, immiscible phases, or a pre-stretching or post stretching coating containing slip particles can be used. These techniques of ensuring adequate winding performance can add complexity and significant cost to the film.

In one particular embodiment, coating the web pre-stretching allows the coating to thin out and expose particles which can lower COF. This can enable a low enough COF to wind rolls of sufficient quality, provided air can be removed between successive wound layers. Representative techniques for ensuring the removal of air include edge knurling and/or pack winding. However, edge knurling can cause losses in film yield, as the edge knurls must be removed from the multilayered film product. Pack winding can lead to other roll winding defects, as known in the art. Typically, several microns of relief or protrusions are needed in order to accommodate air when winding rolls. Typical pre-stretching coatings can be as thick as several microns; however, the coatings thin by the draw ratio if compliant and non-fracturing. Coating pre-stretching matte coatings can also suffer reduced surface area coverage as the particulates or phases which create a matte surface can spread and separate, leaving non-matte regions on the surface of the film.

In some cases, beads commonly used for slip coatings are sized so that the post stretching coating thickness is no less than the radius of the bead, in order to get adequate anchoring. This means that most pre-stretching slip coatings must use sub micron beads in order to get adequate anchoring. In contrast, fractured coatings can retain most of their pre-stretching thickness, thus substantially larger beads can be utilized. The amount of stretching of coating before fracture can also be tailored to meet the bead and/or surface topography of the skin that is desired. In addition, there is evidence that bead loading and interfaces assist in fracture mechanics of matte coatings, i.e. more numerous the beads, the higher the number of fracture events resulting in higher haze and lower clarity.

In one particular embodiment, the interaction of fractured coating remnants with multilayer film skin layers of the present disclosure can enable approximately 3× the surface area of matte as the skins create valleys adjacent to the remnants of the fractured coating area. The added coverage of matte area can provide surface and optical characteristics similar to that attained with a post stretching coating step. In contrast, post stretching coating is often costly and complicated. In one particular embodiment, pre-stretching coating can also result in fewer coating defects compared to post stretching coating, as fractured coatings spread and randomize to hide or mute any pre-stretching coating defects. In one particular embodiment, the fractured coatings are not mainly bulk scattering and related to surface unevenness, the multilayer film can be coated or laminated and nearly all light scattering events can be eliminated.

Figure 2A:
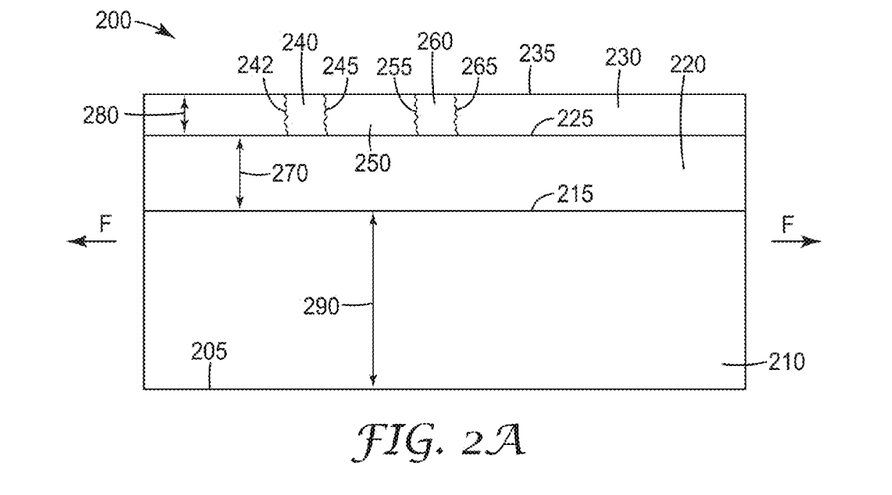
FIG. 2A is a cross-sectional schematic of a polymeric multilayer film.

FIG. 2A is a cross-sectional schematic of a polymeric multilayer film such as an optical film 200 according to one aspect of the disclosure. Optical film 200 includes a polymeric film 210 having a first major surface 215, a second major surface 205, and a first polymeric film thickness 290. In one particular embodiment, polymeric film 210 is a multilayer optical film, as described elsewhere. A first polymer layer 220 (i.e., a skin layer) is disposed on the first major surface 215 to a polymer layer thickness 270. A fracturable layer 230 having a coated thickness 280 is disposed on the first polymer layer 220 to form an interface 225 between the first polymer layer 220 and the fracturable layer 230, and a free surface 235. A stretching force "F" is shown to be applied to the plane of the optical film 200.

In one particular embodiment, each of the layers in optical film 200 is comprised of a material that responds in a different manner to applied stress resulting from the stretching force "F". In some cases, the polymeric film 210 is a polymer layer that strain hardens upon application of the stretching force "F", and as such, the first polymeric film thickness 290 uniformly decreases as the optical film 200 stretches. The first polymer layer 220 is a polymer layer that either does not strain harden (i.e., remains essentially amorphous), or strain hardens to a lesser degree than polymeric film 210, or even only slightly, upon application of the stretching force "F", and as such, the polymer layer thickness 270 non-uniformly decreases as the optical film 200 stretches. First polymer layer 220 typically "thins down" non-uniformly, a behavior of stretching a generally non-strain-hardenable polymer film that is well known in the art.

Materials can be chosen such that the first polymer layer 220 has a Tg lower than the strain hardening layers in 210, or has elements of composition which hinder molecular orientation and alignment. By lowering the Tg of the skin such that under typical film stretching conditions, the polymer "motion" can tend to be great enough that it does not form order. In some cases, this can be done by judicious choice of input skin materials, or it can be done by altering current skin materials using monomers such as hexanediol to lower the Tg of a copolyester. In some cases, materials that can tend to behave as plasticizers or hinder crystal formation, or even molecular segments in the polymer which hinder crystal formation, can be added to the skin layer to effectively lower the Tg. In some cases, utilizing polymers or polymer blends with appropriate monomeric compositions such that even though they exhibit a Tg similar to the oriented materials, the polymer morphology is sufficiently retarded such that no "useful" order or crystallization is observed upon melt quenching or orientation.

In some cases, for example, copolyesters can include modified glycols or modified diacid (or diesters) for the purpose of retarding morphology changes and substantially reducing rates of strain-induced crystallization. Morphological modifiers can be selected from, for example, a modified glycol, a di-acid, a di-ester, or a combination thereof. Representative monomeric modifiers include, for example, neopentyl glycol (NPG) (available from Eastman Chemical Corp, Kingsport, Tenn.), cyclohexanedimethanol (CHDM) (available from Eastman Chemical Corp, Kingsport, Tenn.), dimethyl 5-sodiumsulfoisopththalate (DMSSIP) (available from DuPont, Wilmington, Del.), sodiumsulfoisophthlaic acid (SSIPA), isophthalic acid (IPA) (available from BP Amoco, Naperville, Ill.), and the like, or combinations thereof.

In some cases, co-monomers such as, for example, hexanediol (available from BASF, Florham Park, N.J.) or dimethyl cyclohexyldicarboxylate (available from Eastman Chem Corp, Kingsport, Tenn.) can be introduced to suppress Tg, which may also be a significant factor in reducing the tendency to strain harden the layer at a given stretching temperature.

Additives which may retard orientation can include, for example, antistats, UV absorbers, oligomeric polyesters, optical brighteners and the like. Such additives can be generally thermally stable, low MW species which are compatible with the polymer. Exemplary material additives may include, for example, Tinuvin 1577—a triazine ultraviolet absorber (available from Ciba, Tarrytown, N.J.); THTs (UVA/HALS combo) such as Cyasorb THT6435 (available from Cytec, Woodland Park, N.J.); Optical Brighteners (e.g Eastobrite OB-1, Eastman, Kingsport, Tenn.); and the like; and combinations thereof.

As used herein, a "strain hardenable material" generally means a material that either crystallizes, or changes state of crystallinity, as it stretches. Typically, such materials can exhibit a birefringence of greater than about 0.05 after stretching at an appropriate processing temperature. In some cases, the strain hardenable material can be described in terms of % crystallinity and/or melting peak size and shape as measured, for example, by differential scanning calorimetry (DSC), as known to one skilled in the art. Also as used herein, a "substantially amorphous" material generally means a material that is capable of exhibiting birefringence less than about 0.05 after stretching at the processing temperature. Further, as used herein, a "fracturable material" generally means a material that is not capable of being stretched to the same extent as the other layers in the optical film 200, and thus, beyond the material's % elongation capability (at the processing temperature), it therefore undergoes fracture.

The stretching force "F" generates a plurality of cracks in the fracturable layer 230. Generally, cracks may be formed randomly across the free surface 235 of the fracturable layer 230. In some cases, cracks may be initiated at desired positions by externally imparting some feature, e.g., scratches, impressions, and the like, to the free surface 235 prior to stretching. In one particular embodiment, FIG. 2A shows a first crack 242, a second crack 245, a third crack 255, and a fourth crack 265, forming a first region 240, a second region 250, and a third region 260, in the fracturable layer 230. Cracks can be distributed in any fashion across the surface of the fracturable layer 230. In some cases, cracks can form the boundaries of "islands" which can range in diameter from about a few hundreds of nanometers to about a few hundreds of microns. In some cases, cracks can form the boundaries of "stripes" which can also range in width from about a few hundreds of nanometers to about a few hundreds of microns.

Figure 2B:
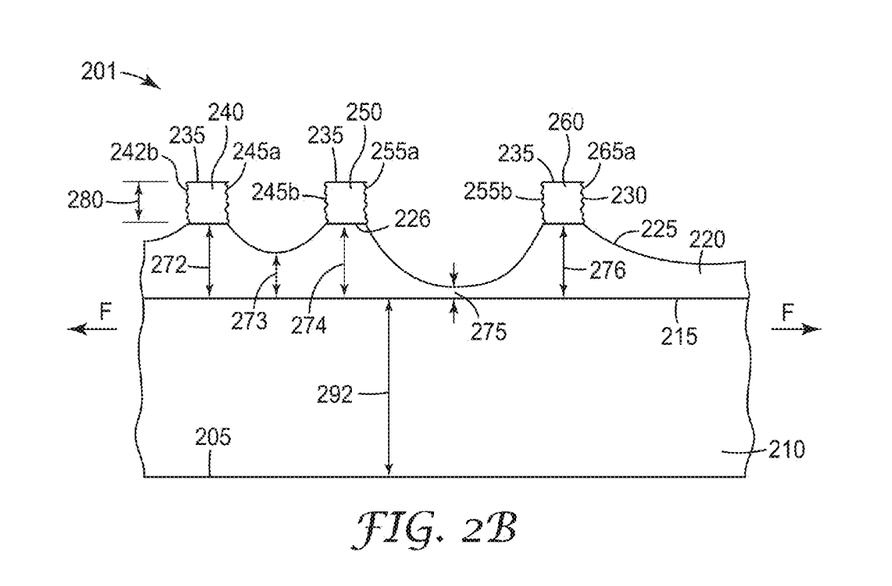
FIG. 2B is a cross-sectional schematic of a textured film.

FIG. 2B is a cross-sectional schematic of a polymeric multilayer film such as an optical film 201 according to one aspect of the disclosure. Optical film 201 can be a textured film 201 that includes a polymeric film 210 having a first major surface 215, a second major surface 205, and a first polymeric film thickness 292, as described elsewhere. Each of the elements 205-290 shown in FIG. 2B correspond to like-numbered elements 205-290 shown in FIG. 2A, which have been described previously. Each of the first region 240, second region 250, and third region 260 have become separated from each other after stretching the optical film 200 shown in FIG. 2A to the extent shown in FIG. 2B. In particular, first crack 242 has widened to create two first crack surfaces 242a (not shown) and 242b; second crack 245 has widened to create two second crack surfaces 245a, 245b; third crack 255 has widened to create two third crack surfaces 255a, 255b; and fourth crack 265 has widened to create two third crack surfaces 265a, 265b (not shown).

As the optical film 201 stretches, each of the film layers experiences forces that, due to the nature of the materials in each film layer, results in different changes to each layer. For example, the polymeric film 210 comprises a material which can strain-harden upon application of the stretching force "F". Such a strain-hardening film uniformly decreases in a thickness 292 as the film stretches. The polymer layer 220 comprises a material which does not strain harden upon application of the stretching force "F". Such a generally non strain-hardening layer tends to decrease thickness in a non-uniform manner, i.e., "thins down" selectively as the layer stretches. This thinning down of the film is well known. Finally, in the positions where the polymer layer 220 has a fracturable coating adhered to the surface 226, the layer may not thin down, and the polymer layer 220 can be considered to be "reinforced" by the fracturable coating. Strain hardening or non-strain hardening behavior of a material can depend on a variety of processing conditions, such as, for example, the temperature at which the stretching is performed relative to the glass-transition temperatures (Tg) of each of the materials and the rate at which the stretching is performed. The strain hardening behavior can also depend on the sequence of stretching, such as, for example sequential or concurrent uniaxial or biaxial stretching; or true uniaxial stretching, i.e., relaxation in a direction perpendicular to the draw direction and standard cross web stretch only without length orientation. True uniaxial stretching, or "parabolic" stretching, has been described, for example, in U.S. Pat. No. 6,939,499 (Merrill et al.); U.S. Pat. No. 6,916,440 (Jackson et al.); U.S. Pat. No. 6,949,212 (Merrill et al.); and U.S. Pat. No. 6,936,209 (Jackson et al.).

The thickness of the polymer layer 220 varies across the first major surface 215 of the stretched film, creating the first major surface 215 texture. For example, a first thickness 272 under first region 240 may be different from a second thickness 274 under second region 250, and also different from a third thickness 276 under third region 260. However, in some cases, at least two of the first, second and third thicknesses 272, 274, 276 may be essentially the same, or they may be different. The thickness of the polymer layer 220 between adjacent regions decreases by the thinning down of this layer, and as such, a fourth thickness 273 and a fifth thickness 275 can be generally less than any of the first, second or third thicknesses 272, 274, 276, respectively. In one particular embodiment, the difference in thickness of the polymer layer 220 across the first major surface 215 can be, for example, greater than about 0.1 microns, or greater than about 0.5 microns, or greater than about 1 micron, or greater than about 3 microns, or even greater than about 5 microns. In some cases, the difference in thickness of the polymer layer 220 across the first major surface 215 can be essentially the coated thickness 270 of the polymer layer 220 as shown in FIG. 2A, i.e., the thickness can be reduced to near zero in some portions of the polymer layer 220.

Figure 2C:
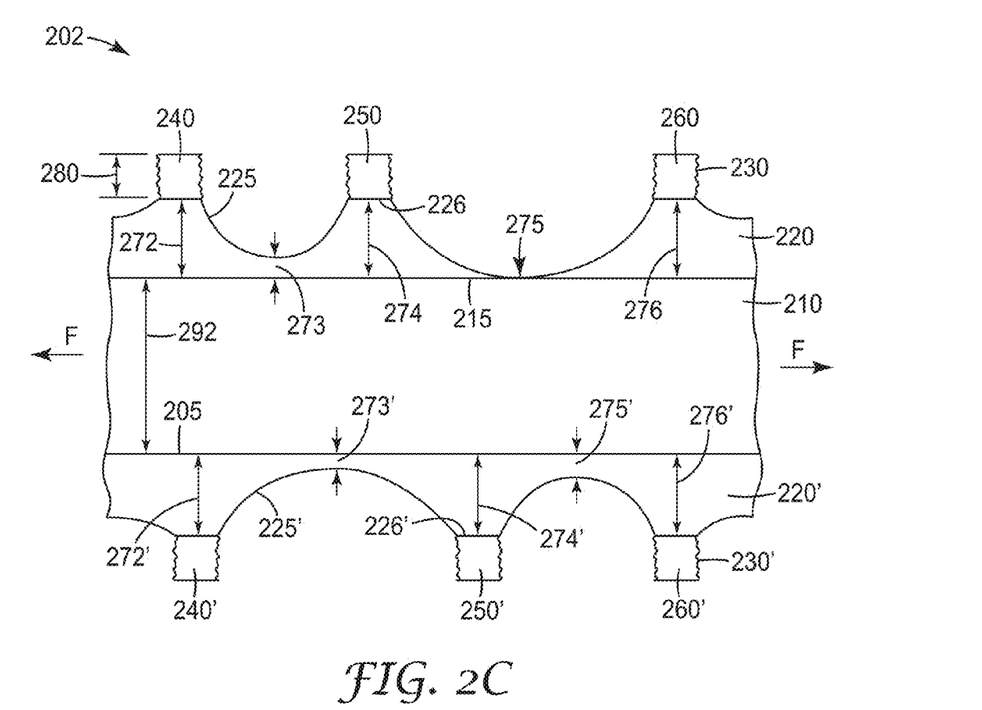
FIG. 2C is a cross-sectional schematic of a textured film.

FIG. 2C is a cross-sectional schematic of a polymeric multilayer film such as an optical film 202 according to one aspect of the disclosure. Optical film 202 can be a two-sided textured film 202 that includes a polymeric film 210 having a first major surface 215, a second major surface 205, and a first polymeric film thickness 292, as described elsewhere. Each of the elements 205-292 shown in FIG. 2C correspond to like-numbered elements 205-292 shown in FIG. 2B, which have been described previously. In FIG. 2C, a second polymer layer 220' is coated on the second major surface 205, and a second fracturable layer 230' is disposed on the second polymer layer 220'.

In some cases, for example, as shown in FIG. 2C, the thickness of the first polymer layer 220 under selected fractured regions can decrease as the film is stretched. For example, the second thickness 274 is shown to be less than first thickness 272 and third thickness 276, indicating that as the film is stretched, some of the material under the second fractured region 250 is moved to different portions of the polymer layer 220 during stretching. In some cases, the polymer layer 220 can thin down to essentially zero thickness, as shown, for example, at fifth thickness 275. Such variations in the thickness of polymer layer 220 can be due to the materials used in the layer, and/or the process conditions during the stretch, such as, for example, the temperature or draw rate, as described elsewhere. In some cases, materials and process conditions can affect the variations in thickness but only in the way in which it affects the cracked coating, i.e., if the cracked coating elongates somewhat, then it doesn't resist the draw force in the skin as much as an area where the cracked coating does not elongate. Phase size and thickness of the coating region can generally affect the movement and form of layer 220.

In FIG. 2C, the thickness of the second polymer layer 220' varies across the second major surface 205 of the stretched film, creating the second major surface 205 texture, similar to the first major surface 215 texture described previously for FIG. 2B. For example, a sixth thickness 272' under fourth region 240', may be different from a seventh thickness 274' under fifth region 250', and also different from an eighth thickness 276' under sixth region 260'. In some cases, at least two of the sixth, seventh and eighth thicknesses 272', 274', 276' may be essentially the same, or they may be different. The thickness of the polymer layer 220' between adjacent regions decreases by the thinning down of this layer, and as such, a ninth thickness 273' and a tenth thickness 275' can be generally less than any of sixth, seventh and eighth thicknesses 272', 274', 276', respectively.

Figure 3A:
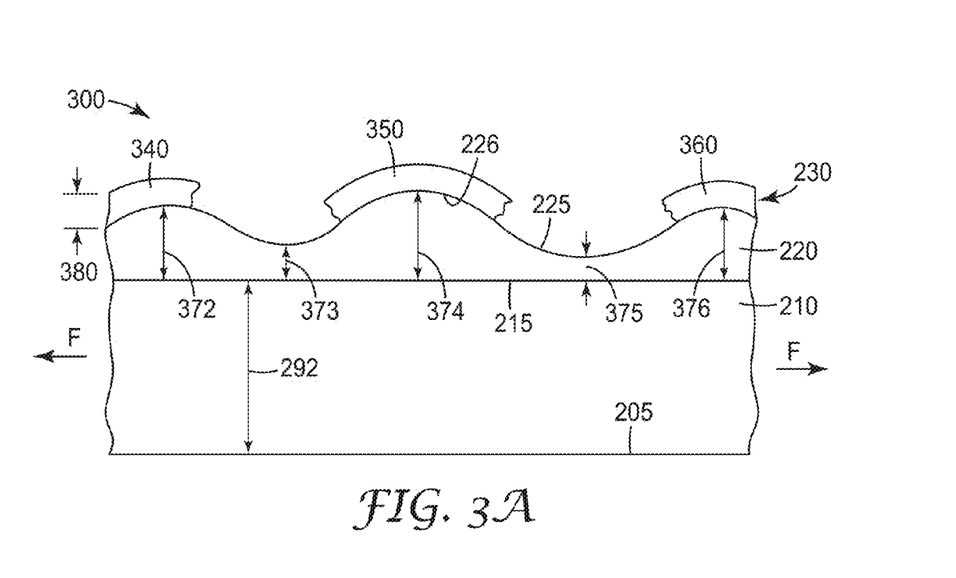
FIG. 3A is a cross-sectional schematic of a textured film.

FIG. 3A is a cross-sectional schematic of a polymeric multilayer film such as an optical film 300 according to one aspect of the disclosure. Optical film 300 can be a textured film 300 that includes a polymeric film 210 having a first major surface 215, a second major surface 205, and a first polymeric film thickness 290, as described elsewhere. Each of the elements 205-292 shown in FIG. 3A correspond to like-numbered elements 205-292 shown in FIG. 2B, which have been described previously. In FIG. 3A, the polymer layer 220 has a thickness that not only varies on the free surface 225 between a first, a second, and a third fractured region 340, 350, 360, but also varies on the adhered surface 226 below each of the regions. In some cases, a fractured layer thickness 380 remains essentially constant over the area of the fractured region as shown in FIG. 3A.

Figure 3B:
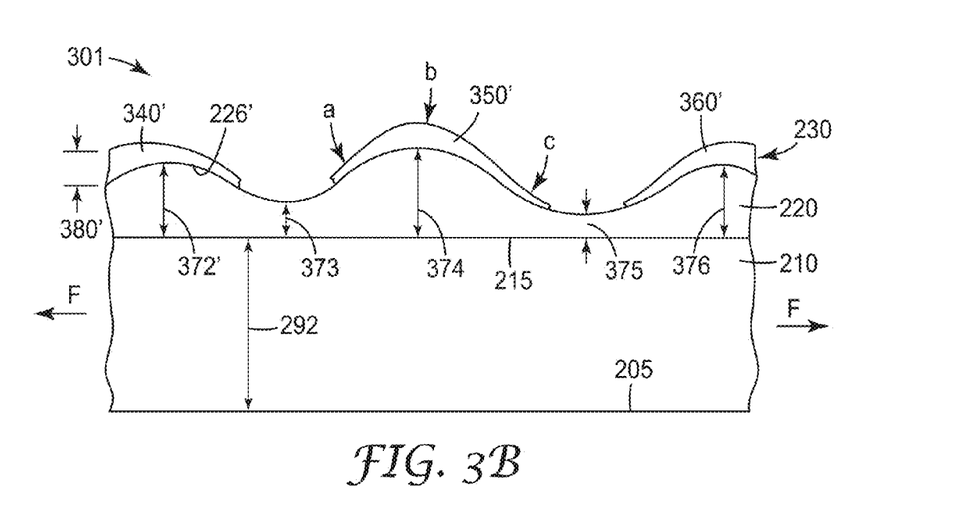
FIG. 3B is a cross-sectional schematic of a textured film.

In some cases, a fractured layer thickness 380' can vary over the area of the fractured region as shown in FIG. 3B, which shows a polymeric multilayer film such as an optical film 301 according to one aspect of the disclosure. In FIG. 3B, for example, the fractured region thickness 380' of second fractured region 350' can be thinned at a first position "a" and a third position "c" relative to a second position "b". This variation in fractured region thickness 380' can be due to, for example, the materials used in the layer, and/or the process conditions during the stretch, such as, for example, the temperature or draw rate, as described elsewhere.

In some cases, the stretch temperature can affect the brittleness of the coating, such that if the draw temperature profile during tentering were chosen such that the preheat differs from the stretch, the film could become hot enough above a softening point of the coating for a portion of the draw. In order to get proper orientation of the strain hardening layer, the temperature profile should preferably be balanced, i.e., if the preheat of the web was hotter, then the stretch must be colder, as compared to a equal temperature profile between preheat and stretch zones.

In such a case where a crosslinking mechanism exists in the coating the brittleness, and therefore the appearance of the cracking, can be affected by the activation energy of the crosslinking chemistry, the nature and quantity of catalyst, amount of crosslinker, and other known mechanisms that can affect the onset of brittleness. In other cases, addition of materials that serve to plasticize or coalesce the coating can have an opposite or attenuating effect on the character of the surface. Coalescing agents are well known in the art, and can include materials such as Dowanol DPM or n-methylpyrrolidone.

Figure 4:
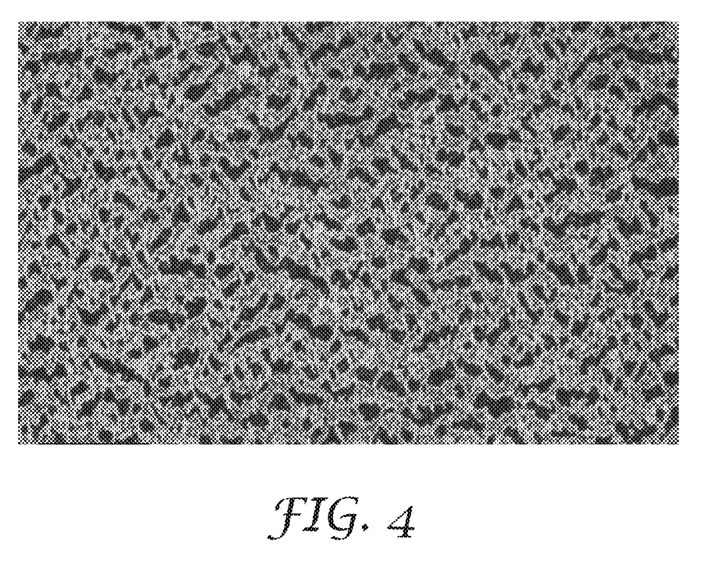
FIG. 4 is a top view photograph of a textured film.

FIG. 4 is a top view photograph of an optical film, according to one aspect of the disclosure. Some of the benefits which can be realized by using the fractured coatings according to the present disclosure include defect hiding, scratch resistance, and anti-wet out. Antistatic materials can also added to fractured coatings and have shown to be effective. In some cases, multilayer optical films used in displays often require matte and/or high haze/low clarity to create uniform displays. It can be difficult to develop high haze/low clarity coatings which are visually acceptable and low cost. The fractured coating and corresponding skin layer interactions described herein enable surface characteristics which can emulate costly post stretching coatings.

Several applications of multilayer optical films require lamination using a UV curable adhesive to secure layers of PET or PC to one or both sides of the MOF. The UV adhesives wet out the matte surface and should have no apparent effect on the end laminate use, thus these films can be used as a reduced cost "certified component" whereas the fractured surface can be exposed (in the case of single side laminates) or can be encapsulated (in the case of dual side laminates), without the use of a premask layer to assist in winding. Other multilayer optical films can be stand alone thicker films which incorporate an immiscible blend to develop a matte surface. These blends can lead to some undesirable bulk scattering, can have limitations on cross web uniformity and/or levels of acceptable haze/clarity, and often can have surface characteristics which can wet out to other films in a display stack. A pre-stretching fractured coating such as described herein may achieve higher haze and lower clarity than can be achieved with immiscible blends, while retaining desired optical characteristics and cross web uniformity.

New MOF designs can be created using the fractured coatings of the present disclosure. In one particular embodiment, we have discovered that the thickness of the fracturable coating can have a large impact on the amount of reinforcement of the skin and roughly the threshold of coating thickness required to impact the optical stack. In one particular embodiment, selection of the skin or fracturable coating can result in a film where a reinforcing layer is laminated to one side of the film, wetting out the matte, and the other side can be used as a functional part of, for example, an LCD display. In some cases, once the fracturable coating is thick enough, or the skins are thin enough, the optical stack can be impacted only on the outer most adjacent layers.

While an order is implied for the various stretching, or draw, processes, the order is not intended to be limiting. In certain instances the order of the processes can be changed or performed concurrently as long as subsequently performed processes do not adversely affect previously performed processes. For example, the material may be drawn in two directions at the same time. When the film is concurrently drawn along both in-plane axes the draw temperature will be the same for the materials in the film. The draw ratio and rate, however, may be separately controlled. For example, the film may be drawn relatively quickly in the first direction, e.g., downweb, and relatively slowly in the second direction, i.e., crossweb.

The materials, draw ratio and rate of the concurrent biaxial draw may be suitably selected such that a draw along a first draw axis (e.g., the quick draw) is optically orienting for one or both materials along the first draw axis while the draw in the other direction (e.g., the slow draw) is non-orienting (or non-optically orienting for one of the two materials along the second draw axis. Thus, it will be appreciated that the response of the two materials to the draw in each direction may be independently controlled. Using such a process, the optical characteristics (e.g., x, y, or z-axis refractive indices matching of adjacent layers in a multilayer optical film) and/or the mechanical properties (e.g., resistance to tear or creasing, stiffness, or dimensional stability including but not limited to warpage, thermal and hygroscopic expansion and shrinkage) may be improved.

Many different materials may be used to fabricate the optical films in accordance with the present invention. The materials must generally be suitable for processing into the desired structure. For example, if a multilayer film is to be produced, two or more materials which can be formed into multiple layers must be chosen. If the multilayer structure is coextruded, then the materials selected must be coextrudable. The materials should be formable into a good cast web that can be drawn. Interlayer adhesion and post processability should also be considered in construction of a multilayer film. The material should also be free from any undesirable orientation prior to the draw processes. Alternatively, deliberate orientation can be induced during the casting step as a process aid to the first draw step. For example the casting step may be considered part of the first draw step. In another example, the casting step can be a nucleating step for crystallization that alters the relaxation characteristics of the second material for subsequent draw steps.

The materials used in the optical film must also exhibit the desirable optical properties (e.g., birefringence) and must have different enough visco-elastic characteristics to permit proper selection of processing conditions for the desired result. In selecting materials consideration may be given to glass transition temperatures, crystallization and crosslinking behaviors, molecular weight averages and distributions, chemical compositions and structures and other optical properties (e.g., refractive indices, dispersion, etc.).

The following examples include exemplary materials and processing conditions in accordance with different embodiments of the invention. The examples are not intended to limit the invention but rather are provided to facilitate an understanding of the invention as well as to provide examples of materials particularly suited for use in accordance with the various above-described embodiments.

EXAMPLES

The following list of materials and their source is referred to throughout the Examples. If not otherwise specified, materials are available from Aldrich Chemical, Milwaukee, Wis. Multilayer films were generally prepared according to methods described in, for example, U.S. Pat. No. 6,179,948 (Merrill et al); U.S. Pat. No. 6,827,886 (Neavin et al); 2006/0084780 (Hebrink et al); 2006/0226561 (Merrill et al.); and 2007/0047080 (Stover et al.).

Haze and clarity measurements were performed according to the instrument specifications using a Haze-Gard Plus haze meter from BYK-Gardner, Silver Springs, Md. Static charge decay times were measured using a Model 406C Static Decay Meter from Electo-Tech Systems, Inc. This instrument charged the sample to 5 kV and measured the time required for the charge to decay to 10% of its initial value. All samples not containing an antistat were insulating and therefore would not accept the 5 kV initial charge. Samples were acclimated to an environment of 23 C/50% RH for at least 12 hrs before testing.

Preparation of WB-50 Sulfopolyester Dispersion:

WB-50 was prepared as follows (materials available from Aldrich Chemical, Milwaukee, Wis.). A one gallon polymerization kettle was charged with 111.9 g (5.5 mol %) 5-sodio-sulfoisophthalic acid, 592.1 g (47.0 mol %) terephthalic acid, 598.4 g (47.5 mol %) isophthalic acid, 705.8 g ethylene glycol, 599 g neopentyl glycol, 0.7 g antimony oxide, and 2.5 g sodium acetate. The mixture was heated with stirring to 230 C at 345 kPa (50 psi) under nitrogen for 2 hours, during which time water evolution was observed. The temperature was increased to 250 C and the pressure was then reduced, vacuum was applied (0.2 torr), and the temperature was increased to 270 C. The viscosity of the material increased over a period of 45 minutes, after which time a high molecular weight, clear, viscous sulfopolyester was drained. This sulfopolyester was found by DSC to have a Tg of 70.3 C. The theoretical sulfonate equivalent weight was 3847 g polymer per mole of sulfonate. 500 g of the polymer was dissolved in a mixture of 2000 g water and 450 g isopropanol at 80 C. The temperature was then raised to 95 C in order to remove the isopropanol (and a portion of the water). The final dispersion consisted of an aqueous 20 wt/wt % solids dispersion of WB-50.

Preparation of 0.45 Micron Polystyrene (PS) Latex Beads:

Into a 40-liter reactor was added 19.0 kg of deionized water, 183.0 g of Aerosol MA 80-I, 264.0 g of Sipomer COPS I, 19.8 g of sodium bicarbonate, 10.4 kg of styrene, and a mixture of 26.4 g potassium persulfate and 5.3 kg deionized water. The reactor was de-aerated by sparging nitrogen to the bottom for 15 minutes. Then it was switched to a nitrogen cap of the reactor through a condenser to vent. The reactor was heated to 70 degree C. under agitation and condenser cooling, and held for 8 hours. The contents were then cooled to room

| | |
|---|---|
| Carboset CR781 - acrylic copolymer emulsion | Lubrizol Co., Wickliffe, Ohio |
| Carboset PC21 - acrylic copolymer emulsion | Lubrizol Co., Wickliffe, Ohio |
| Rhoplex 3208 - acrylic latex dispersion | Dow Chemical Co., Midland, MI |
| A6075 - Neocryl A6075 acrylic emulsion | DSM Neoresins, Waalwijk, The Netherlands |
| Aerosol MA 80-I - surfactant | CYTEC Industries Inc., West Paterson, NJ |
| Sipomer COPS I - polymerizable surfactant | Rhodia Inc., Cranbury, NJ |
| Tomadol 25-9 surfactant | Air Products Co., Allentown, PA |
| D17 - antistat | prepared as described in WO2009014897A example P12 |
| 1100D - Hydro-Rez 1100D sulfopolyester resin dispersion | Hexion Specialty Chemicals, Columbus, OH |
| WB-50 sulfopolyester dispersion | Prepared as described below |
| CM327 - Cymel 327 crosslinker | CYTEC Industries Inc., West Paterson, NJ |
| CM323 - Cymel 323 crosslinker | CYTEC Industries Inc., West Paterson, NJ |
| Cycat 4045 - catalyst | CYTEC Industries Inc., West Paterson, NJ |
| Cycat 4040 - catalyst | CYTEC Industries Inc., West Paterson, NJ |
| BH302 - Bayhydur 302 | Bayer Material Science, Pittsburgh, PA |
| TS-3SC - 3 micron PMMA beads | Soken Chemical and Engineering Co, Tokyo |
| MX-150 - 1.5 micron crosslinked acrylic beads | Soken Chemical and Engineering Co, Tokyo |
| MX-300 - 3 micron crosslinked acrylic beads | Soken Chemical and Engineering Co, Tokyo |
| 0.45 micron polystyrene (PS) latex beads | Prepared as described below |
| SBX-6 - 6 micron polystyrene beads | Sekisui Plastics Co, Osaka, Japan |
| PETg - Glycol modified Polyetheylene Terephthalate Copolymer (grades 6763 and GN071) | Eastman Chemical, Kingsport, TN | temperature and drained through cheesecloth to result in a PS latex of 30% solids (by weight), and 0.45 micron average particle size.

Premix Dilutions

For Examples 1-24 below, the following premix dilutions were made. Tomadol 25-9 (100% solids as received) was diluted to 10 wt/wt % in water. Cycat 4045 and 4040 (35% and 40% solids, respectively) were diluted to 10 wt/wt % in water. The Cymel crosslinkers were used as received or diluted to 10 or 20 wt/wt % solids by slow addition of the Cymel to the appropriate amount of vigorously stirred water. When a Cymel crosslinker was used as received, it was added to the binder emulsion and mixed until homogenous. Beads were diluted to a premix of 28 wt/wt % solution in water, except where noted.

Coating Techniques

For each of Examples 1-22, the respective fracturable coating formulation was coated using a #6 wire-wound rod on the respective substrate at 100 to 175 ft/min. In all cases the coating was applied before transverse direction stretching, and, if applicable, after length direction stretching.

The each of Examples 23 and 24, the respective fracturable coating formulation was coated on a previously cast, but unstretched substrate described below, using a #6 wire-wound rod. The wet coatings were then dried during the process of batchwise stretching to produce the desired coated substrate.

Examples 1-11

Preparation of Fracturable Coating Composition "1"

Each of Examples 1 through 11 used the same Fracturable Coating Composition, Composition "1", which was prepared as follows, with details provided in Table 1. The Cymel crosslinking agent was placed in a mixing container with magnetic stirring to which was added the specified amount of component A (except where noted). This was stirred for approximately 30 minutes or until homogeneous. Water was then added followed by the 10% surfactant, 10% catalyst, the bead solution and finally antistat D17, if present. This mixture was stirred for another 10 minutes followed by ultrasonic agitation for approximately 20 minutes. The fracturable coating compositon was applied as indicated in the Coating Techniques section.

Coated and Stretched Film Preparations for Examples 1-11

Examples 1, 2 and 9 used a cast web substrate referred to herein as MOF "A", a multilayer optical film having skin layers of PETg. In this and all other Examples, the commercially available PETg employed is believed to have an ethylene glycol to cyclohexanedimethanol ratio of approximately 7:3. The optical stack of 305 alternating polymer layers contained high-index layers made from a polyethylene naphthalate copolymer having 90% naphthalate moieties and 10% terephthalate moieties (90:10 coPEN); and low-index isotropic layers made from a blend of 45:55 (wt/wt) of 90:10 coPEN with PETg. This substrate was coated inline with Fracturable Coating Composition "1". Immediately after coating, the web passed into a tenter that was divided into three zones—preheat, stretch, and heat set. Temperatures and dwell times, respectively, for the three zones were as follows: Preheat 156° C., 8 seconds; Stretch 154° C., 13 seconds; Heat Set 146° C., 8 seconds. Transverse draw ratio in the stretch zone was 5.8:1, yielding a final substrate thickness of 36 microns. The PETg skin thicknesses were 4.5 microns.

Examples 3-8 and 10-11 used a cast web substrate referred to herein as MOF "B", a multilayer optical film having skin layers made of a blend of 45:55 (wt/wt) of 90:10 coPEN and PETg. The optical stack of 305 alternating polymer layers contained high-index layers made from 90:10 coPEN and low-index isotropic layers made from a blend of 45:55 (wt/wt) of 90:10 coPEN and PETg. This substrate was coated inline with Fracturable Coating Composition "1". Immediately after coating, the web passed into a tenter that was divided into three zones—preheat, stretch, and heat set. Temperatures and dwell times, respectively, for the three zones were as follows: Preheat 146° C., 14 seconds; Stretch 146° C., 22 seconds; Heat Set 146° C., 14 seconds. Transverse draw ratio in the stretch zone was 5.9:1, yielding a final substrate thickness of 28 microns.

TABLE 1

| Example No. | Haze, % | Clarity, % | Dry Coating (nm) | Water (g) | Tomadol 25-9 (g) | Component A | Component A (g) | Cycat 4045 (g) | Crosslinker | Crosslinker (g) | Beads | Beads (g) |
|---|---|---|---|---|---|---|---|---|---|---|---|---|
| 1[1] | 55 | 21 | 298 | 26.6 | 0.60 | CR781 | 15.0 | 0.36 | CM327 | 2.0 | TS-3SC | 7.7 |
| 2 | 49 | 41 | 298 | 33.3 | 0.60 | PC21 | 19.7 | 0.99 | CM323 | 1.8 | MX-150 | 3.5 |
| 3[1] | 44 | 59 | 298 | 26.6 | 0.60 | CR781 | 15.0 | 0.36 | CM327 | 2.0 | TS-3SC | 7.7 |
| 4 | 42 | 57 | 298 | 33.3 | 0.60 | PC21 | 19.7 | 0.99 | CM323 | 1.8 | MX-150 | 3.5 |
| 5 | 38 | 64 | 298 | 27.6 | 0.60 | CR781 | 21.4 | 0.36 | CM323 | 2.3 | 0.45 micron | 7.7 |
| 6 | 3 | 100 | 298 | 27.6 | 0.60 | Rhoplex 3208 | 21.4 | 0.36 | CM323 | 2.3 | 0.45 micron | 7.7 |
| 7 | 39 | 60 | 298 | 27.6 | 0.60 | PC21 | 21.4 | 0.36 | CM323 | 2.3 | 0.45 micron | 7.7 |
| 8[1] | 58 | 44 | 298 | 26.3 | 0.60 | PC21 | 15.0 | 0.36 | CM323 | 2.3 | 0.45 micron | 7.7 |
| 9[2] | 65 | 22 | 200 | 62.1 | 1.00 | PC21 | 16.7 | 0.40 | BH302 | 2.6 | TS-3SC | 8.6 |
| 10[4] | 2 | 100 | 275 | 21.3 | 1.50 | Rhoplex 3208 | 18.6 | 0.33 | CM327 | 8.2 | None | 0.0 |

TABLE 1-continued

| Example No. | Haze, % | Clarity, % | Dry Coating (nm) | Water (g) | Tomadol 25-9 (g) | Component A | Component A (g) | Cycat 4045 (g) | Crosslinker | Crosslinker (g) | Beads | Beads (g) |
|---|---|---|---|---|---|---|---|---|---|---|---|---|
| 11[3,4] | 59 | 59 | 329 | 19.4 | 1.50 | Rhoplex 3208 | 18.6 | 0.33 | CM327 | 8.2 | MX150 | 2.0 |

[1]7.7 g D17 antistat added
[2]8.6 g D17 antistat added
[3]beads as received (undiluted with water)
[4]Crosslinker at 20% in water, added after catalyst The static decay of Examples 1, 3, and 9 was determined to be 0.01 seconds, and the static decay of Example 8 was determined to be 0.02 seconds, by the method described above.

Examples 12-24

Preparation of Fracturable Coating Composition "2"

Each of Examples 12 through 24 used the same Fracturable Coating Composition, Composition "2", which was prepared as follows, with details provided in Table 2. Component A was placed in a mixing container with magnetic stirring to which was added in succession; water, 10% surfactant, 10% catalyst, aqueous pre-mix of the Cymel crosslinker, beads (aqueous solutions or dry solids as indicated in the table), and 1100D emulsion, if used. This was stirred and then ultrasonically agitated as described previously for Composition "1". Substrate preparation and coating techniques are described elsewhere.

Coated and Stretched Film Preparations for Examples 12-24

Examples 12-14 used a cast web substrate referred to herein as MOF "C", a multilayer optical film having skin layers made of a polyethylene naphthalate copolymer having 75% naphthalate moieties and 25% terephthalate moieties (on a diester/diacid basis); and 91.4% ethylene glycol moieties, 8% hexanediol moieties, and 0.6% trimethylolpropane moieties (on a diol basis). The optical stack of 825 alternating polymer layers contained high-index layers made from PEN homopolymer and low-index isotropic layers made from a polyethylene naphthalate copolymer having 55% naphthalate moieties and 45% terephthalate moieties (on a diester/diacid basis); and 91.4% ethylene glycol moieties, 8% hexanediol moieties, and 0.6% trimethylolpropane moieties (on a diol basis). This substrate was coated inline with Fracturable Coating Composition "2". Immediately after coating, the web passed into a tenter that was divided into three zones—preheat, stretch, and heat set. Temperatures and dwell times, respectively, for the three zones were as follows: Preheat 161° C., 32 seconds; Stretch 144° C., 14 seconds; Heat Set 154° C., 15 seconds. Transverse draw ratio in the stretch zone was 6.1:1, yielding a final substrate thickness of 94 microns.

Examples 15-18 used a cast web substrate referred to herein as PET "A", a single layer film made from optical quality polyethylene terephthalate having 0.18 mol % of trimethylolpropane moieties replacing ethylene glycol moieties. The polyester was extruded and cast on a chilled roll as known in the art. Once cast, the substrate was sent through a machine-direction stretching, or "length orienting", device at a preheat temperature of 81 C, draw gap of 30 cm, and draw ratio of 3.2. Once length oriented, the substrate was coated inline with Fracturable Coating Composition "2". Immediately after coating, the web passed into a tenter that was divided into three zones—preheat, stretch, and heat set. Temperatures and dwell times, respectively, for the three zones were as follows: Preheat 95° C., 30 seconds; Stretch 104° C., 20 seconds; Heat Set 220° C., 40 seconds. Tranverse draw ratio in the stretch zone was 3.7:1, yielding a final substrate thickness of 175 microns.

Examples 19-22 used a cast web substrate referred to herein as PET "B", a three layer film having a core layer made from the same PET resin as that of PET "A", and outer layer skins made of PETg. The PET core and PETg skins were co-extruded using a multi-manifold die at a 0.136:1 ratio of the skins to the core. The polyesters were co-extruded and cast on a chilled roll as known in the art. Once cast, the substrate was sent through a machine-direction stretching, or "length orienting", device at a preheat temperature of 82° C., draw temperature of 81° C., draw gap of 30 cm, and draw ratio of 3.19:1. Once length oriented, the substrate was coated inline with Fracturable Coating Composition "2". Immediately after coating, the web passed into a tenter that was divided into three zones—preheat, stretch, and heat set. Temperatures and dwell times, respectively, for the three zones were: preheat 94° C., 30 seconds; stretch 104° C., 20 seconds; heat set 195° C., 40 seconds. Transverse draw ratio in the stretch zone was 3.6:1, yielding a final substrate thickness of 250 microns.

Example 23 used a cast web substrate referred to herein as MOF "D", a multilayer optical film having skin layers made of SA115, a polyester/polycarbonate alloy resin (available from Eatman Chemical, Kingsport, Tenn.). The optical stack of 275 alternating polymer layers contained high-index layers made from 90:10 coPEN and low-index isotropic layers made from an 85:15 (wt/wt) blend of SA115 and PETg. This substrate was coated offline with Fracturable Coating Composition "2". Immediately after coating, the web passed into the oven of a batch film stretching instrument. The web was heated at an oven temperature of 160° C. for 60 seconds, and then stretched with the two remaining sides unconstrained (to simulate a parabolic (true uniaxial) stretch) to a Transverse draw ratio 6.0:1, yielding a final substrate thickness of 35 microns.

Example 24 used a cast web substrate referred to herein as MOF "E", a multilayer optical film having skin layers made of an 85:15 (wt/wt) blend of VM365 polyester/polycarbonate alloy (available from Eastman Chemical, Kingsport Tenn.) and NAS 30 acrylic-styrenic copolymer (available from INEOS NOVA LLC, Channahon, Ill.). The optical stack of 825 alternating polymer layers contained high-index layers made from PEN homopolymer and low-index isotropic layers made from a polyethylene naphthalate copolymer having 50% naphthalate moieties and 50% terephthalate moieties (on a diester/diacid basis); and 78.8% ethylene glycol moieties, 20% hexanediol moieties, and 1.2% trimethylolpropane moieties (on a diol basis). This substrate was coated offline with Fracturable Coating Composition "2". Immediately after coating, the web passed into the oven of a batch film stretching instrument. The web was heated at an oven temperature of 160° C. for 60 seconds, and then drawn (while constrained in the non-stretch direction, to simulate stretching in a conventional film tenter) to a Transverse draw ratio 6.0:1, yielding a final substrate thickness of 152 microns.

TABLE 2

| Example No. | Haze, % | Clarity, % | Dry Coating (nm) | Water (g) | Tomadol 25-9 (g) | Component A | Component A (g) | Cycat 4045 (g) | Crosslinker | Crosslinker (g) | Beads | Beads (g) |
|---|---|---|---|---|---|---|---|---|---|---|---|---|
| 12[1,2] | 0.7 | 99.7 | 251 | 0.8 | 1.50 | WB50 | 34.4 | 0.39 | CM327 | 9.9 | — | — |
| 13[1] | 17 | 78 | 251 | 21.3 | 0.50 | Rhoplex 3208 | 18.0 | 0.39 | CM327 | 9.9 | — | — |
| 14[1] | 45 | 20 | 251 | 20.4 | 0.50 | CR781 | 18.8 | 0.39 | CM327 | 9.9 | — | — |
| 15[3] | 29 | 92 | 360 | 16.7 | 0.40 | A6075 | 14.3 | 0.24 | CM323 | 6.0 | MX300 | 2.4 |
| 16[3] | 26 | 91 | 360 | 19.1 | 0.40 | A6075 | 14.3 | 0.24 | CM323 | 6.0 | — | — |
| 17[3] | 58 | 61 | 360 | 16.7 | 0.40 | PC21 | 14.3 | 0.24 | CM323 | 6.0 | MX300 | 2.4 |
| 18[3] | 55 | 30 | 360 | 19.1 | 0.40 | PC21 | 14.3 | 0.24 | CM323 | 6.0 | — | — |
| 19[3] | 17 | 67 | 300 | 22.6 | 0.40 | A6075 | 11.9 | 0.20 | CM323 | 5.0 | — | — |
| 20[3] | 28 | 60 | 300 | 22.6 | 0.40 | A6075 | 11.9 | 0.20 | CM323 | 5.0 | SBX-6 | 2.0 |
| 21[3] | 23 | 59 | 300 | 22.6 | 0.40 | A6075 | 11.9 | 0.20 | CM323 | 5.0 | MX300 | 2.0 |
| 22[3] | 26 | 59 | 300 | 22.6 | 0.40 | PC21 | 11.9 | 0.20 | 10% CM323 | 5.0 | — | — |
| 23[1,4] | 75 | 16 | 256 | 54.7 | 1.0 | CR781 | 23.4 | 0.33 | CM327 | 1.6 | MX150 | 1.8 |
| 24[1,4] | 73 | 19 | 256 | 54.7 | 1.0 | CR781 | 23.4 | 0.33 | CM327 | 1.6 | MX150 | 1.8 |

[1]Crosslinker at 20% in water
[2]1100D emulsion added at 3.1 grams
[3]Crosslinker at 10% in water
[4]18.7 grams D17 antistat added In some embodiments, higher haze/lower clarity (often desirable for optical or display reasons) can be achieved through lower effective draw ratios. This can be clearly seen by comparing cracked coating samples created with true uniaxial stretching vs "constrained" uniaxial stretching. Typical ranges of haze and clarity for various film configurations are shown in Table 3.

TABLE 3

| Substrate | Typical maximum haze | Typical minimum clarity | uncoated stretched film skin thickness (microns) | Stretching type |
|---|---|---|---|---|
| MOF "B" | 35-50 | 40-55 | 1.5 | uniaxial |
| MOF "A" | 45-55 | 25-40 | 6 | uniaxial |
| MOF "C" | 60-70 | 20-35 | 8 | uniaxial |
| MOF "E" | 65-80 | 10-25 | 40 | uniaxial |
| MOF "D" | 70-85 | 10-25 | 12 | true uniaxial |

The embodiments described can be used anywhere that a textured film can be used, for example, to aid in winding or stacking of polymeric films, or for control of optical properties of haze and clarity. The embodiments described can be applied anywhere that thin, optically transmissive structures are used, including light management films or light management film stacks; backlights including hollow and solid backlights; displays such as TV, notebook computers, computer monitors; and also as used for advertising, information display or lighting. The present disclosure is also applicable to electronic devices including laptop computers and handheld devices such as Personal Data Assistants (PDAs), personal gaming devices, cellphones, personal media players, handheld computers and the like, which incorporate optical displays. Backlights using textured films of the present disclosure have application in many other areas. For example, backlit LCD systems, luminaires, task lights, light sources, signs and point of purchase displays can be made using the described embodiments.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of texturing a film, comprising:
   providing a multilayer film comprising a polymer film and a polymer layer disposed on a first major surface of the polymer film;
   disposing a fracturable layer on the polymer layer, opposite the polymer film; and
   stretching the multilayer film to fracture the fracturable layer into a plurality of separated regions, each of the separated regions adhered to the polymer layer,
   wherein a portion of a first thickness of the polymer layer adhered to each of the separated regions is greater than a second thickness of the polymer layer between at least one adjacent separated region.

2. The method of claim 1, wherein stretching the multilayer film is done at a temperature between the glass transition temperature (Tg) and the melting temperature (Tm) of the polymer film.

3. The method of claim 2, wherein the temperature is greater than Tg of the polymer layer, and less than Tg of the fracturable layer.

4. The method of claim 1, wherein the polymer film comprises a strain-hardening polymer film.

5. The method of claim 1, wherein the polymer layer does not substantially strain-harden.

6. The method of claim 1, wherein the polymer layer has less strain hardening than the polymer film.

7. The method of claim 4, wherein the strain-hardening polymer film comprises a multilayer optical film.

8. The method of claim 1, wherein the fracturable layer comprises a crosslinked material.

9. The method of claim 1, wherein disposing the fracturable layer comprises solution coating the fracturable layer.

10. The method of claim 1, wherein stretching comprises stretching in a first direction, or stretching in a second direction perpendicular to the first direction, or stretching in a combination of the first direction and the second direction.

11. The method of claim 10, wherein stretching in the first direction and stretching in the second direction occur essentially simultaneously.

12. The method of claim 10, wherein stretching in the first direction and stretching in the second direction occur sequentially.

* * * * *

UNITED STATES PATENT AND TRADEMARK OFFICE
CERTIFICATE OF CORRECTION

PATENT NO.       : 9,102,131 B2
APPLICATION NO.  : 13/635942
DATED            : August 11, 2015
INVENTOR(S)      : Derks et al.

Page 1 of 1

It is certified that error appears in the above-identified patent and that said Letters Patent is hereby corrected as shown below:

On the title page,

Item 87
Line 1, Delete "WO2011/119687" and insert -- WO2011/119387 --, therefor.

In the specification,

Column 1
Line 10, Delete "is" and insert -- in --, therefor.

Column 8
Line 21, Delete "5-sodiumsulfoisopththalate" and insert -- 5-sodiumsulfoisophthalate --, therefor.
Line 22, Delete "sodiumsulfoisophthlaic" and insert -- sodiumsulfoisophthalic --, therefor.

Column 13
Line 32, Delete "Electo-Tech" and insert -- Electro-Tech --, therefor.
Line 61, Delete "Polyetheylene" and insert -- Polyethylene --, therefor.

Column 16
Line 4, Delete "compositon" and insert -- composition --, therefor.

Column 18
Line 17, Delete "Tranverse" and insert -- Transverse --, therefor.

Signed and Sealed this
Thirty-first Day of May, 2016

Michelle K. Lee
*Director of the United States Patent and Trademark Office*